United States Patent [19]

Hindman et al.

[11] Patent Number: 4,729,803
[45] Date of Patent: Mar. 8, 1988

[54] METHOD OF FILLING A CABLE WITH A FLOODING COMPOUND

[75] Inventors: Thomas D. Hindman; Thomas J. Roessing, both of Parker; Joseph D. Burkhard, Petrolia, all of Pa.

[73] Assignee: Witco Corp., New York, N.Y.

[21] Appl. No.: 6,079

[22] Filed: Jan. 23, 1987

Related U.S. Application Data

[62] Division of Ser. No. 734,676, May 16, 1985, Pat. No. 4,716,191.

[51] Int. Cl.⁴ .............................................. H01B 13/14
[52] U.S. Cl. .................. 156/48; 156/244.12; 174/23 C; 264/174
[58] Field of Search ............... 156/48, 244; 174/23 C, 174/23 R; 524/525, 488, 489; 523/173; 264/174

[56] References Cited

U.S. PATENT DOCUMENTS

| | | | |
|---|---|---|---|
| 3,672,974 | 6/1972 | Tomlinson | 156/48 X |
| 3,836,695 | 9/1974 | Strecker et al. | 174/23 C |
| 3,876,487 | 4/1975 | Garrett et al. | 156/48 X |

*Primary Examiner*—Robert A. Dawson
*Attorney, Agent, or Firm*—Morton Friedman; Marvin Feldman

[57] ABSTRACT

A flooding compound for a waterproof communications cable is formed from a heated mixture of 92-94% by weight of a microcrystalline wax, 3-5% polyethylene and 2-4% of a rubber. The heated mixture is extruded between the plastic jacket and core sheath of a cable. The compound exhibits the adhesive and slip characteristics of, and is a replacement for, atactic polypropylene.

6 Claims, No Drawings

METHOD OF FILLING A CABLE WITH A FLOODING COMPOUND

This is a division of application Ser. No. 734,676, filed May 16, 1985 and now U.S. Pat. No. 4,716,191.

FIELD OF THE INVENTION

This invention relates to a flooding compound for waterproof communication cables.

BACKGROUND AND DISCUSSION OF THE PRIOR ART

A communications cable is generally constructed of an outer plastic jacket and an inner metal core wrap with an annular space therebetween. The core wrap enwraps a plurality of twisted insulated conductors with a filler material, such as petrolatum, wax, and other hydrocarbons between the conductors. The presence of the annular space is shown in U.S. Pat. No. 3,745,231, granted July 10, 1973 to Eager, Jr. et al. This annular space between the outer plastic jacket and the core wrap is often filled with a flooding compound. The flooding compound had to exhibit a sufficient combination of adhesive and slip characteristics to remain intact during bending of the cable and yet permit ready stripping of the cable when required. One such flooding compound that has met with a high degree of success is atactic polypropylene.

Because of uncertainties in the commercial supply of atactic polypropylene, the industry desired a substitute which exhibited substantially similar physical and water-resistant properties.

Now there is provided by the present invention a flooding compound which exhibits the adhesive and slip characteristics of atactic polypropylene, and yet may be readily compounded and extruded between the outer plastic jacket and metal core wrap of a communication cable.

SUMMARY OF THE INVENTION

A flooding compound is formed by mixing a wax in an amount of at least 90% by weight with an elastomeric polymer, generally formed by combining polyethylene with about equal amounts of a rubber. The invention contemplates the method for making the compound and filling the cable, as well as the filled communication cable.

DESCRIPTION OF THE PREFERRED EMBODIMENTS

In one aspect, the present invention is a flooding compound which combines at least 85% and preferrably at least 90% by weight of a wax, preferrably a microcrystalline wax, and an elastomeric polymer. The elastomeric polymer is preferrably formed by combining about equal amounts of polyethylene and rubber.

One preferred flooding compound of the present invention is shown in Table I below.

TABLE I

| Composition | Percent by Weight |
| --- | --- |
| Microcrystalline wax | 92–94 |
| Polyethylene | 2–6 |
| Rubber | 2–5 |

It has been found that the wax should preferably be a microcrystalline wax having a relatively high melting point of 170°–180° F. (ASTM D-127), an intermediate penetration of 25–35 (ASTM D-1321) and a molecular weight range of 450–600. One most preferred microcrystalline wax is Multiwax 445, manufactured by Witco Chemical Co., New York, N.Y.

Suitable polyethylenes include those having narrow molecular weights of from 6,900 to about 7,300 weight average and 2,600 to about 3,000 number average, and a relatively low hardness of less than 0.7 at 25° C. (W-301-IW). The viscosity should be about 450 cp at 140° C. (W-304-IW). One preferred polyethylene is Allied AC-9 (Allied Chemical Corp., Morristown, N.J.).

Suitable rubber materials include; butyl rubbers, that is, copolymers of isobutylene and isoprene and polyisobutylene. The rubber must be wax soluble. The preferred rubber is an ethylene-propylene copolymer, such as Vistalon 404 (Exxon Chemical Corp., Florham Park, N.J. 07932). The rubber should preferably exhibit a Mooney viscosity range of 35 min.–45 max. cp ML 1+8 at 100° C., a minimum tensile strength of 1800 psi and a minimum percent elongation of 350%.

It was found that the microcrystalline wax-polyethylene-rubber blends as afore-described gave essentially the same jacket slip properties of atactic polypropylene, and passed the Rural Electrification Administration (R.E.A.) Test 15 lb. minimum standard. The product of the present invention also had similar flexibility characteristics to atactic polypropylene.

It has also been found that additions of 0.2 to 1.0% by weight of a stabilizer such as BHT may be added.

The compound of the present invention has been found particularly suitable for replacing atactic polypropylene as the flooding compound in communication cables.

The following example is included for the purpose of demonstrating the desirable properties of the flooding compound. It must be understood that this example is for the purpose of illustration only and should not be construed as limiting of the invention.

EXAMPLE

The following composition was formed by dissolving the rubber in the wax, and then dissolving the polyethylene in the mixture all at 220° F. to 260° F. until blending was complete.

| Weight % | Component |
| --- | --- |
| 93.0 | Microcrystalline wax[1] |
| 4.0 | Polyethylene[2] |
| 3.0 | Rubber[3] |
| 0.4 | BHT |

[1] Multiwax ML 445 (Witco Chemical Corp.)
[2] AC-9 Polyethylene (Allied Chemical Corp.)
[3] Vistalon 404 (Exxon Chemical Corp.)

The blended mixture was then extruded at elevated temperatures of 220° F. to 260° F., between the outer plastic jacket and inner aluminum core wrap of a communication cable. This extrusion temperature is substantially less than that needed for atactic polypropylene, which is generally extruded at temperatures of 300° to 400° F.

Although the invention has been described in considerable detail, such detailed description is only for the purpose of illustrating specific embodiments. It is evident that many variations and modifications may be made from those described without departing from the spirit and scope of the invention.

What is claimed is:

1. A method of filling a cable with a flooding compound comprising;
    (a) dissolving a wax soluble rubber in a microcrystalline wax at an elevated temperature between 220° F. to 260° F., said rubber comprising an ethylene-propylene copolymer;
    (b) dissolving polyethylene in the mixture of step (a), and said wax being present in at least 90% by weight;
    (c) extruding the mixture of step (b) at about said elevated temperature, between a metal sheath and a plastic cable covering of said cable, and wherein the extruded mixture has the jacket slip characteristics of atactic polypropylene as defined by the R.E.A. 15 lb. minimum test standard.

2. The method of claim 1, said extruding being between 220° F. to 260° F.

3. A method of filing a cable with a flooding compound comprising;
    (a) dissolving a wax soluble rubber in a microcrystalline wax at an elevated temperature;
    (b) dissolving polyethylene in the mixture of step (a), wherein the wax is present in at least 90% by weight;
    (c) extruding the mixture of step (b) at about said elevated temperature, between a metal sheath and a plastic cable covering of said cable, and wherein the extruded mixture has the jacket slip characteristics of atactic polypropylene as defined by the R.E.A. 15 lb. minimum test standard.

4. The method of claim 3, the dissolving steps (a) and (b) taking place between 220° F. to 260° F.

5. The method of claim 3, said rubber comprising a copolymer of ethylene and propylene.

6. The method of claim 3, said extruding being between 220° F. to 260° F.

* * * * *